United States Patent [19]
Dodd

[11] 4,195,386
[45] Apr. 1, 1980

[54] SHACKLE UNLOADING DEVICE

[76] Inventor: Ned T. Dodd, Rte. 2, Lula, Ga.

[21] Appl. No.: 928,819

[22] Filed: Jul. 28, 1978

[51] Int. Cl.² .................................................. A22C 21/00
[52] U.S. Cl. .................................................. 17/44.1; 17/11
[58] Field of Search ........................... 17/44.1, 44.2, 11

[56] References Cited
U.S. PATENT DOCUMENTS

| | | | |
|---|---|---|---|
| 3,042,186 | 7/1962 | Varney | 17/11 X |
| 3,097,391 | 7/1963 | Wayne | 17/44.1 X |
| 3,380,113 | 4/1968 | Zebarth et al. | 17/44.1 X |
| 3,537,127 | 11/1970 | Brugman | 17/11 |
| 4,071,924 | 2/1978 | Meyn | 17/44.1 X |

*Primary Examiner*—Willie G. Abercrombie
*Attorney, Agent, or Firm*—B. J. Powell

[57] ABSTRACT

A shackle unloading device for unloading poultry supported in shackles by their hocks where the shackles are adapted to be unloaded by lifting upwardly on the legs of the poultry adjacent their hocks which includes a conveyor for moving the shackles successively along a predetermined conveying path while the poultry is supported from the shackles by their hocks together with a pair of spaced apart unloader bars positioned on opposite sides of the conveying path so that the lower end of the shackles pass between the unloader bars to be held against lateral displacement from the conveying path by the unloader bars while the unloader bars lift upwardly on the hocks of the poultry to release the hocks of the poultry from the shackles and thus unload the shackles.

6 Claims, 6 Drawing Figures

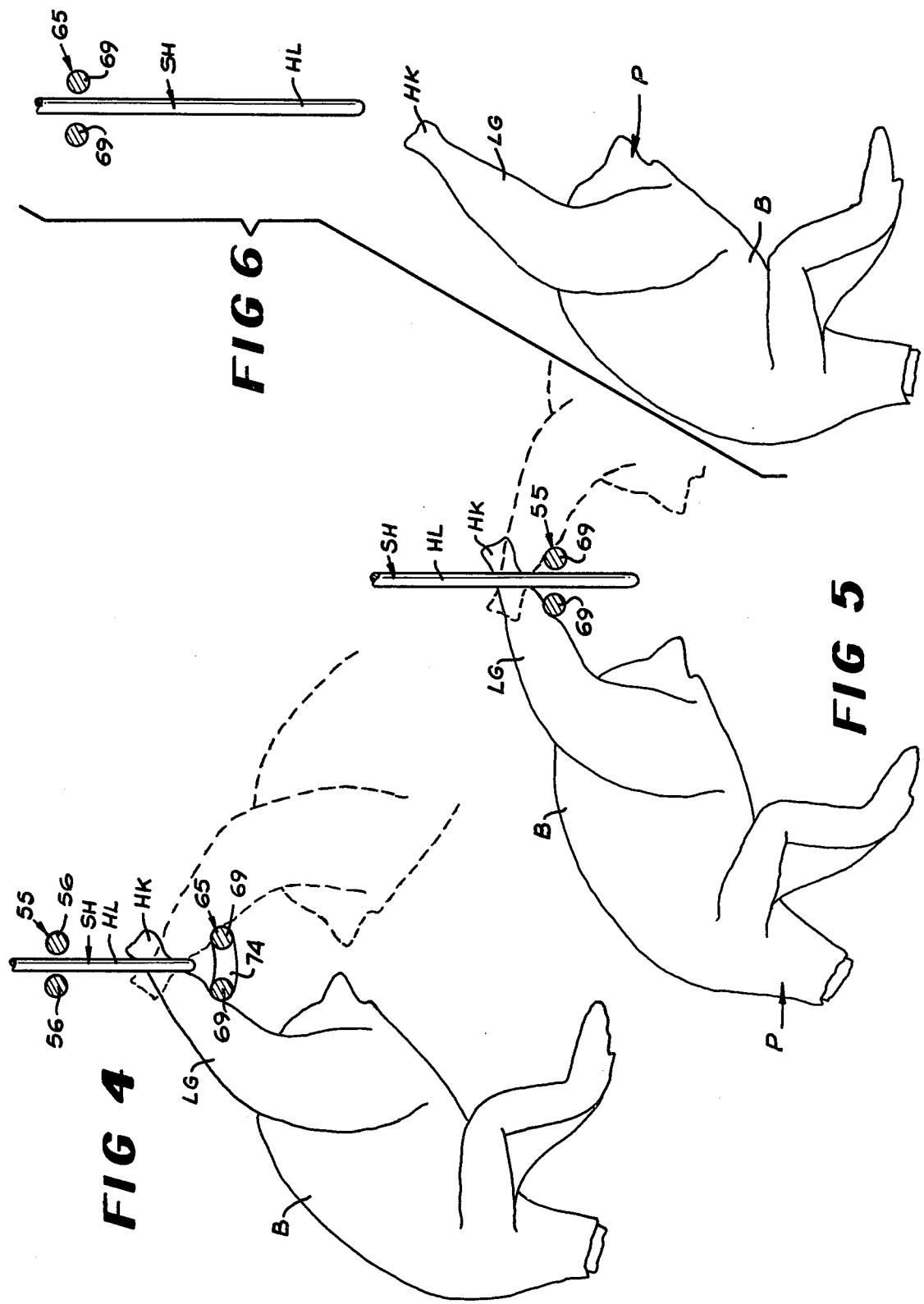

SHACKLE UNLOADING DEVICE

BACKGROUND OF THE INVENTION

1. Field of the Invention

This invention relates generally to poultry shackle unloading devices and more particularly to a poultry shackle unloading device adapted to unload shackles which support poultry by their hocks and which are adapted to be unloaded by lifting upwardly on the legs of the poultry adjacent their hocks.

2. Description of the Prior Art

Poultry are usually suspended by their feet or hocks from shackles during poultry processing operations. Generally, the poultry are suspended by their feet in shackles during the killing, scalding and picking operations and then suspended by their hocks during the evisceration and subsequent operations. Two general types of shackles are used which are mounted on overhead conveyors in these processing operations. One type of shackle positively locks the poultry in the shackle and these shackles are generally used in the initial killing, scalding and picking operations where the poultry are supported by their feet. The other type of shackle has a pair of spaced apart loops which generally support the hocks of the poultry during the evisceration operation. The second type of shackle generally depends on the weight of the poultry to keep the hocks in the loops on the shackle so that the poultry will not be inadvertently dislodged from the shackle. This second type of shackle has been unloaded both by hand and automatically by machine. One of the problems with the automatic unloading of the second type of shackle is that prior art machines have generally required that the shackle be very tightly held while the legs of the bird are lifted adjacent the hock to unload the shackle. An example of the prior art shackle unloaders is illustrated in U.S. Pat. No. 4,071,924. Because of the requirements that the shackles be tightly held during the unloading operation, these devices generally require close tolerances in order to properly operate and also generally were only able to unload poultry which were hung in the shackle from one direction, thereby requiring additional machines to unload the poultry which were hung in the shackles from the other direction.

SUMMARY OF THE INVENTION

These and other problems and disadvantages associated with the prior art are overcome by the invention disclosed herein by providing a shackle unloading device which is capable of unloading the shackle without regard to the direction in which the birds are hung in the shackles and which do not require that the shackles be tightly held by an auxiliary device as the shackles are unloaded.

The apparatus of the invention incorporates the overhead conveyor normally associated with poultry processing operations where the shackles are flexibly suspended from the overhead conveyor so that the overhead conveyor successively moves the shackles along the predetermined conveying path while the shackles support the poultry by their hocks. The invention includes an arcuate track section which is inserted in the overhead conveyor system so that the overhead conveyor moves along the arcuate track section through the shackle unloading device. An idler wheel is provided which is engaged by the overhead conveyor as it moves along the arcuate track section to drive a common shaft carrying the idler wheel. Spaced below the idler wheel on the common shaft is an auxiliary shackle driving wheel which engages the shackles below the conveyor to maintain the shackles generally vertically oriented as they move along the arcuate portion of the conveying path under the overhead track section. Auxiliary guide bars are provided between which the shackles move to maintain driving engagement between the auxiliary driving wheel and the shackles. A pair of spaced apart elongate unloader bars are positioned on opposite sides of the arcuate portion of the conveying path and extend from a position below the lower end of the shackles to a position above the lower end of the shackles so that the lower ends of the shackles pass between the unloader bars and are held against lateral displacement from the conveying path by the unloader bars. The unloader bars also engage the legs of the poultry adjacent the hocks on that side of the shackles opposite that side on which the hocks are located to lift the legs and hocks of the poultry upwardly as the shackles move along the arcuate portion of the conveying path to lift the hocks of the poultry out of engagement with the shackles so that the hocks are freed from the shackles for the poultry to be unloaded from the shackles. It will thus be seen that not only do the spaced apart unloader bars lift the legs of the poultry and the hocks upwardly to release the hocks from the shackles but also hold the lower ends of the shackles against lateral displacement to eliminate the need for positive control of the shackles during the unloading operation.

These and other features and advantages of the invention disclosed herein will become more apparent upon consideration of the following description and accompanying drawings wherein like characters of reference designate corresponding parts throughout the several views and in which:

BRIEF DESCRIPTION OF THE DRAWINGS

FIG. 4 is an enlarged view showing the poultry ready for unloading;

FIG. 5 is an enlarged view similar to FIG. 4 showing the poultry being unloaded; and FIG. 6 is an enlarged view similar to FIGS. 4 and 5 showing the poultry unloaded.

These figures and the following detailed description disclose specific embodiment of the invention; however, it is to be understood that the inventive concept is not limited thereto since it may be embodied in other forms.

DETAILED DESCRIPTION OF ILLUSTRATIVE EMBODIMENTS

Figure 2:
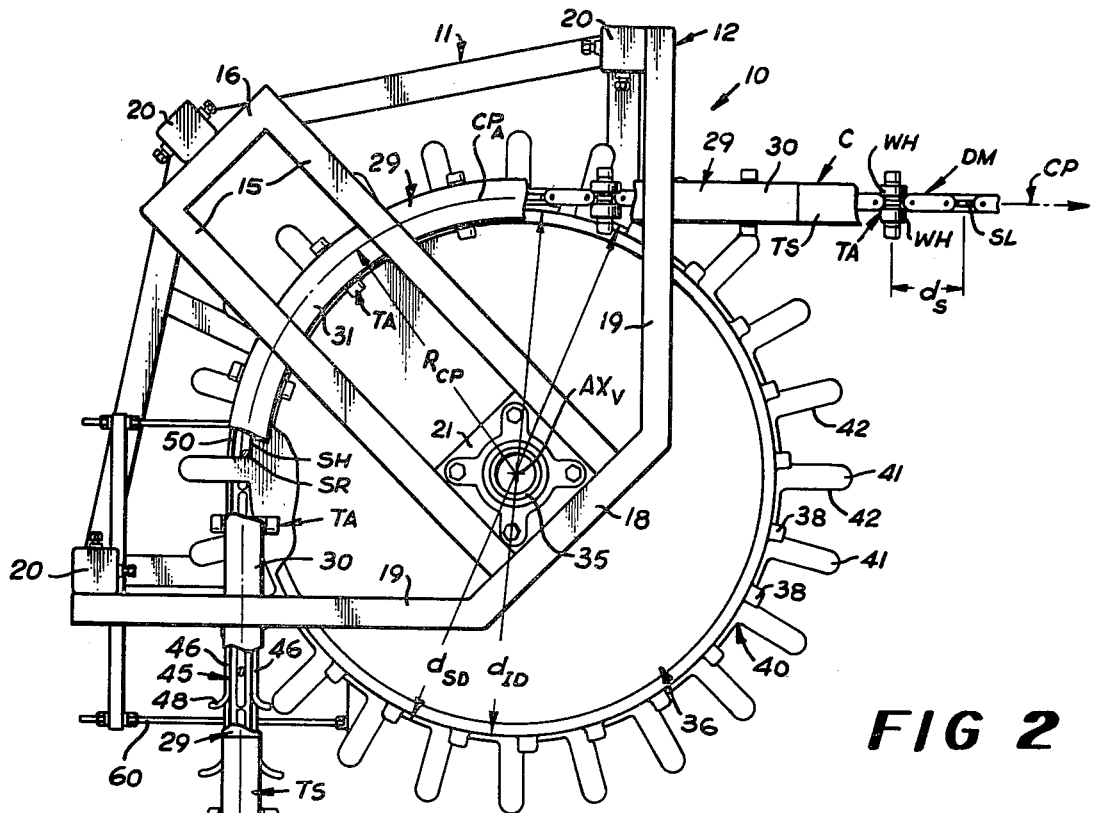
FIG. 2 is a top view of the invention shown in FIG. 1 with portions thereof broken away to show the construction thereof.

Referring to the figures, it will be seen that the shackle unloading device 10 is used in conjunction with an overhead conveyor C which moves the poultry along a prescribed conveying path. The overhead conveyor C includes track sections TS with lower flanges FL that support wheeled trolley assembles TA thereof so that the wheels WH of the trolley assemblies TA roll along the flanges FL of the track sections TS. The trolley assemblies TA are interconnected by a driving and spacing member DM which interconnects the trolley assemblies TA to hold the trolley assemblies TA in spaced apart positions along the track sections TS. The drive member DM is connected to an appropriate conveyor drive (not shown) which pulls the drive member DM and thus the trolley assemblies TA along the track sections TS so that the trolley assemblies TA pass successively along the track sections TS. The drive member DM is flexible and is usually a link chain such as that shown or a cable (not shown). The trolley assemblies TA mount shackle support lugs SL thereon from which shackles are suspended. Some conveyor systems have a trolley assembly TA associated with each shackle lug SL; however, chain type drive members DM usually have a shackle lug SL associated with each trolley assembly TA and shackle lugs SL carried by the drive member DM itself between the trolley assemblies TA. As can be seen in FIG. 2, the shackle lugs SL are spaced apart the distance $d_S$ so that the center to center spacing of the shackles is also the distance $d_S$.

The shackles SH are flexibly supported from the shackle lugs SL by shackle rods SR so that the shackles SH can swing about the shackle lugs SL; however, the distance between the shackles SH and the shackle lugs SL is maintained fairly constant. The shackle rods SR may be movably connected to separate shackles SH or may be incorporated as an integral part of the shackles SH as illustrated in the drawings. The shackle rods SR are attached to the shackle lugs SL through a loop in the upper end of the shackle rods SR as illustrated in the drawings. Each of the shackles SH includes a pair of spaced apart hock holding loops HL which define hock receiving openings HO therethrough closed at their bottom ends and open at their top ends so that the poultry P can be supported in the shackles SH by inserting the hocks HK on the legs LG of the poultry past the hock openings HO in the shackles and forcing the legs LG immediately adjacent the hocks HK down into the hock openings HO with the hocks HK on one side of the shackle SH while the body B of the poultry is on the opposite side of the shackle SH so that the hocks HK retain the poultry P in the shackles within the hock holding loops HL. The weight of the poultry P keeps the poultry in the hock holding loops HL as the conveyor C moves the poultry on through the processing plant in a head lowermost position. It will thus be seen that the overhead conveyor C moves the shackles SH along a prescribed conveying path CP through the processing plant.

The shackle unloading device 10 is positioned adjacent the overhead conveyor C so that the overhead conveyor C passes through the shackle unloading device 10. The shackle unloading device 10 includes generally a lower frame 11 and an upper frame 12 with upright posts 14 extending between the lower frame 11 and upper frame 12 so that the lower and upper frames 11 and 12 lie in generally parallel horizontal planes. The upper frame 12 includes a pair of spaced apart support beams 15 joined at their rear ends by rear cross beam 16 and at their front ends by a front cross beam 18 with the front cross beam 18 extending outwardly on opposite sides of the support beams 15 to join with the angled side beams 19. The beams 15, 16, 18 and 19 all lie in a common plane with the rear cross beam 16 and the outer ends of the angled side beams 19 mounting post connector tubes 20 thereon which are slidably received over the top of the upright posts 14 to support the upper frame 12. Appropriate locking bolts 17 selectively lock the connector tubes 20 to the posts 14 to adjustably position the upper frame 12 thereon. The forward ends of the support beams 15 mount an upper bearing box 21 therebetween at the front cross beam 18.

Figure 3:
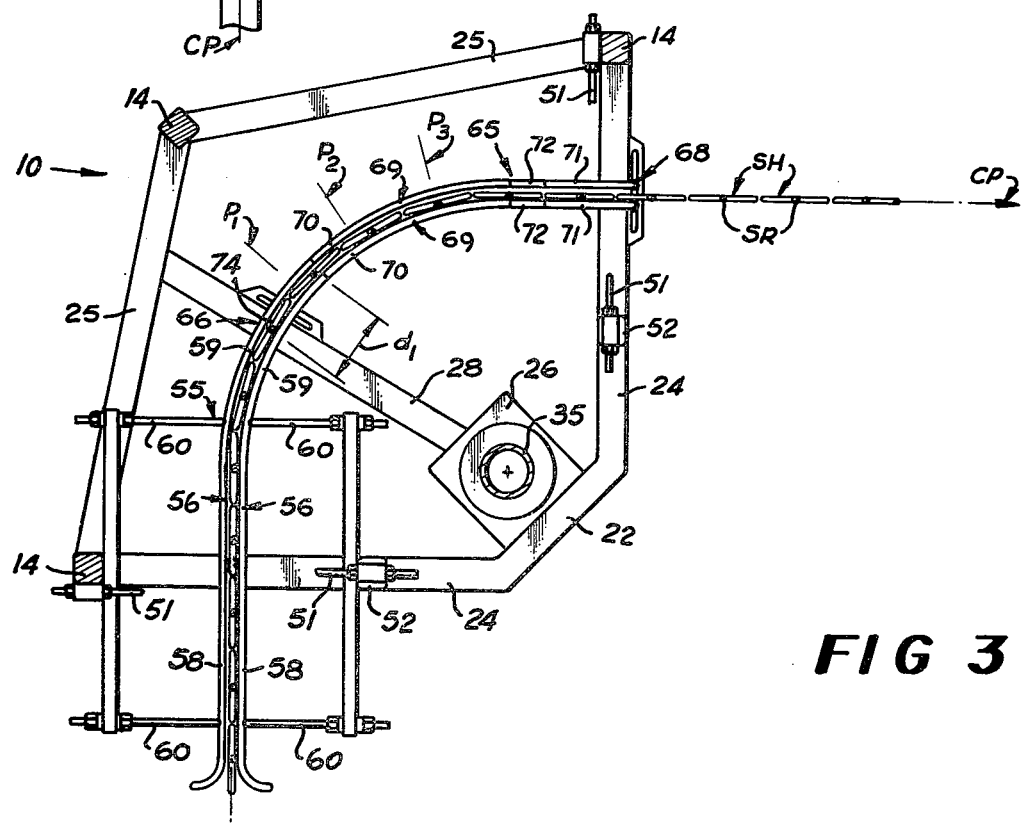
FIG. 3 is a horizontal cross-sectional view taken generally along line 3—3 in FIG. 1.

The lower frame has a front beam 22 generally vertically aligned with the upper front beam 18 with a pair of angled and side beams 24 at opposite ends of the front beam which connect with the lower ends of the upright posts 14 at their outer ends. Rear angle beams 25 connect the lower ends of the side post 14 with the lower end of the rear post 14 to complete the lower frame 11. The lower frame 11 also mounts a lower bearing box 26 on the inside of the front beam 22 in vertical registration with the upper bearing box 21 and a cross brace 28 extends between the bearing box 26 and one of the rear angle beams 25 as best seen in FIG. 3.

The upper frame 12 mounts on the bottom thereof a curvilinear track section 29 having the same cross-sectional shape as the track sections TS. The track sections TS are abutted to opposite ends of the track section 29 so that the track section 29 forms a continuation of the track sections TS. The track section 29 has generally straight end portions 30 with an arcuate central portion 31 so that the arcuate central portion 31 has a radius of curvature $R_{CP}$ centered on the vertical axis $AX_V$ extending through the bearing boxes 21 and 26 as will become more apparent. It will be seen that the arcuate central portion 31 of the track section 29 subtends an arc of 90°; however, it is to be understood that the arcuate central portion 31 may subtend different arcs depending on the desired configuration of the conveyed path CP through the shackle unloading device 10. For example, the subtended arc may be 180°.

It will be seen, then, that the trolley assemblies TA pass from the incoming track section TS associated with the overhead conveyor C onto the track section 29 and subsequently pass from the track section 29 back onto the track section TS at the other end of the track section 29 so that the trolley assemblies TA continue along the track sections TS associated with the overhead conveyor C. It will likewise be seen that the conveying path CP now passes along under the track section 29 so that it has an arcuate portion $CP_A$ as seen in FIGS. 2 and 3 with its center of curvature being axis $AX_V$.

A vertical support shaft 35 is rotatably journalled between the upper and lower bearing boxes 21 and 26 about the vertical axis $AX_V$ so that the support shaft 35 is freely rotatable about the axis $AX_V$. A circular idler drive wheel 36 is affixed to the support shaft 35 so that it lies generally in the plane of the drive member DM as it moves along under the track section 29 with a peripheral diameter $d_{ID}$ so that the drive member DM rides along the periphery of the idler drive wheel 36. Appropriate driving lugs 38 are provided along the periphery of the idler drive wheel 36 which are engaged by the drive member DM to positively rotate the idler drive wheel 36 as the drive member DM moves thereby carrying the trolley assemblies TA and the shackles SH along the path CP. It will be understood that the driving lugs 38 will be engaged by the driving member DM when a chain is used as illustrated but may likewise be engaged by the trolley assemblies TA without departing from the scope of the invention. Thus, it will be seen that the drive member DM positively rotates the idle drive wheel 36 which in turn positively rotates the support shaft 35 since the idler drive wheel 36 is affixed to the support shaft 35. Appropriate lock bolts 39 may be provided on the idler drive wheel 36 to positively yet adjustably lock the drive wheel 36 onto the support shaft 35.

Mounted below the idler drive wheel 36 is a circular auxiliary shackle drive wheel 40 with an outer peripheral diameter $d_{SD}$. The shackle drive wheel 40 is positioned below the track section 29 so that the shackle drive wheel 40 lies in a plane at the lower end of the shackle rods SR just above the shackles SH so that the shackle rods SR will ride on the periphery of the shackle drive wheel 40 as they move along the arcuate portion $CP_A$ of the conveying path CP. The outer periphery of the shackle drive wheel 40 is provided with radially outwardly projecting driving tangs 41 which engage the shackle rods SR to positively move the lower ends of the shackle rods and thus the shackles SH along the arcuate portion $CP_A$ of the conveying path CP. The relative rotational positions of the tangs 41 on the shackle drive wheel 40 are displaced appropriately with respect to the driving lugs 38 on the idler drive wheel 36 so that the leading edge 42 of each of the tangs 41 will engage the shackle rods generally vertically oriented as they move along the arcuate portion $CP_A$ of the conveying path CP. There are usually the same number of driving lugs 38 as there are tangs 41. This is best seen in FIG. 2. Thus, it will be seen that the drive member DM drives the idler drive wheel 36 which in turn drives the shackle drive wheel 40 through the support shaft 35 so that the leading edges 42 on tangs 41 of shackle drive wheel 40 positively drive the lower ends of the shackle rods SR around the arcuate portion $CP_A$ of the conveying path CP as the shackle lugs SL move around the arcuate portion $CP_A$ of the conveying path CP adjacent the track section 29.

Positioned below the auxiliary shackle driving wheel 40 is an auxiliary guide assembly 45 which engages the shackles SH during their movement through the shackle unloading device 10 so as to maintain contact between the shackle rods SR and the leading edges 42 on the tangs 41 of the auxiliary shackle drive wheel 40. The auxiliary guide assembly 45 includes a pair of spaced apart, generally horizontal, auxiliary guide rods 47 which have generally straight incoming and outgoing sections 48 and 49 with a central arcuate section 50 concentric about the vertical axis $AX_V$. The auxiliary guide rods 46 are positioned on opposite sides of the conveying path CP to engage opposite sides of the upper portions of the shackles SH prior to, during, and after engagement of the shackle rods SR by the auxiliary shackle drive wheel 40 to prevent the shackles SH and the shackle rods SR from swinging outwardly laterally of the conveying path CP as the shackles move through the shackle unloading device 10. The auxiliary guide rods 46 are positioned by support rods 51 adjustably connected to the posts 14 as well as a pair of upstanding subposts 52 extending upwardly from opposite ends of the front beam 22 on the lower frame 11.

Positioned below the auxiliary guide assembly 45 at the entry end of the shackle unloading device 10 is an infeed guide assembly 55 which engages the shackles SH just above the hocks HK of the poultry P supported on the hock holding loops HL of the shackles SH to guide the lower ends of the shackles SH along the conveying path CP. The infeed guide assembly 55 includes a pair of spaced apart infeed guide rods 56 lying generally in a horizontal plane and spaced on opposite sides of the conveying path CP so that the shackles SH pass between the infeed guide rods 56 as the shackles pass into the machine. Each of the infeed guide rods 56 has a straight inlet section 58 and an arcuate outlet section 59 so that the arcuate outlet sections 59 are concentric about the vertical axis $AX_V$ and positioned on opposite sides of the conveying path CP. Thus, it will be seen that the infeed guide rods 56 maintain the lower ends of the shackles SH moving along the conveying path CP until the shackles SH pass out from between the arcuate outlet sections 59 of the infeed guide rods 56. The infeed guide rods 56 are supported on mounting rods 60 adjustably mounted on cross arms 61 carried by the side post 14 and subpost 52 on opposite sides of the guide rods 56 as seen in FIG. 3.

Figure 1:
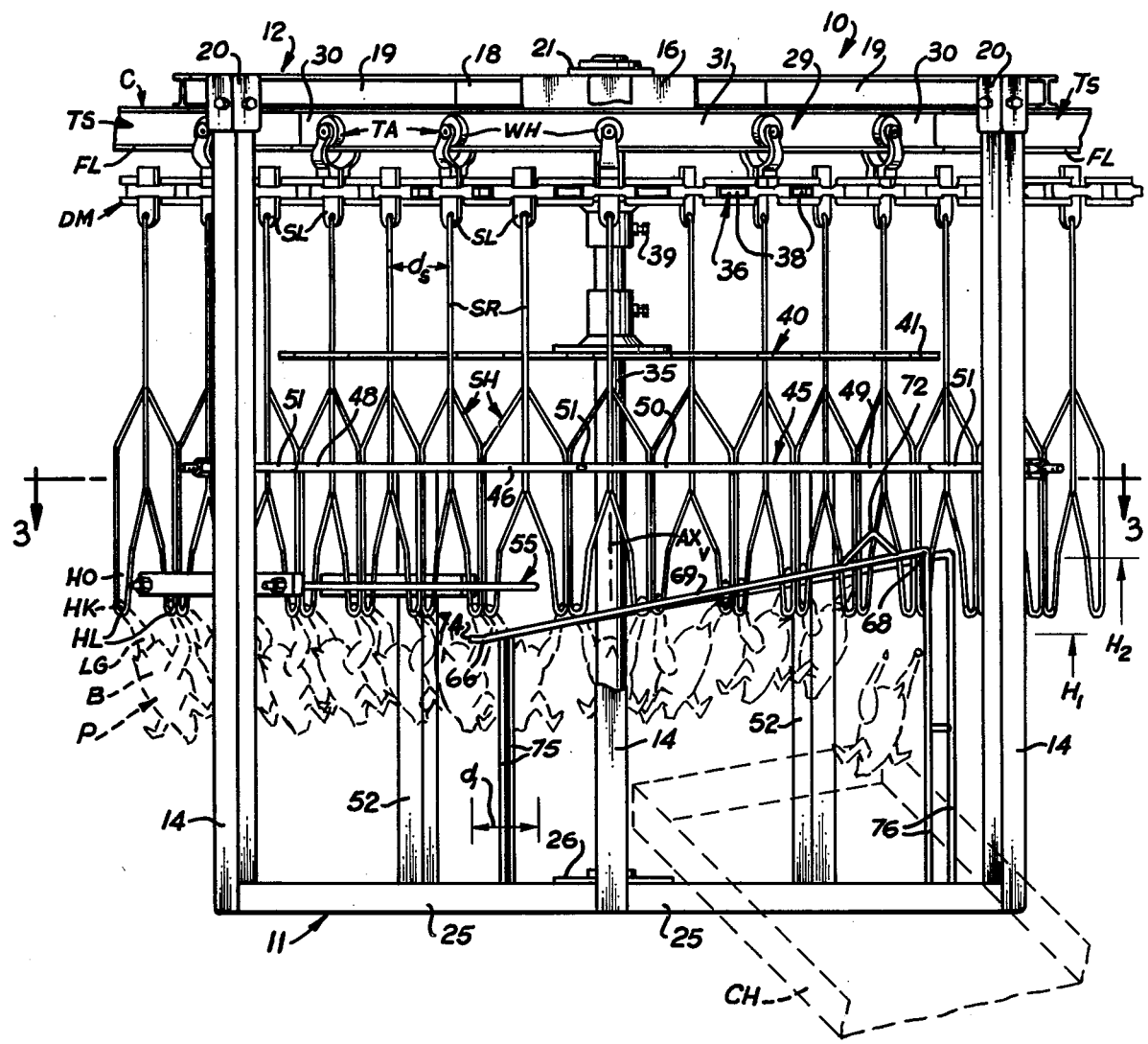
FIG. 1 is a side view of the invention taken from the operating side thereof with parts broken away to show the construction thereof.

An unloader assembly 65 with an inlet end 66 and an outlet end 68 is positioned below the auxiliary shackle drive wheel 40 with its inlet end 66 located below the infeed guide assembly 55 while its outlet end 68 extends above the hock holding loops HL of the shackles SH. The unloader assembly 65 includes a pair of spaced apart unloader bars 69 which have an arcuate inlet section 70 and an outlet straight section 71. It will be seen that the arcuate inlet sections 70 are concentric about the vertical axis $AX_V$ so that the unloader bars 69 extend along opposite sides of the arcuate portion $CP_A$ of the conveying path CP from a height $H_1$ which locates the inlet section 70 at the inlet end 66 below the hock holding loops HL on the shackles SH to a height $H_2$ at the outlet ends of the outlet section 71 located above the hock holding loops HL. Thus, it will be seen that the inlet end 66 of the unloader assembly 65 extends under the outlet end of the infeed guide assembly 55 the distance $d_1$ best seen in FIG. 3 so that the infeed guide assembly 55 continues to guide the shackles SH until the lower ends of the hock holding loops HL pass between the unloader bars 69 and are restrained against lateral movement away from the conveying path CP by the unloader bars 69 engaging the hock holding loops HL of the shackles SH. It will further be seen that the upwardly angled unloader bars 69 engage the legs LG of the poultry P adjacent the hocks HK and on that side of the hock holding loops HL opposite the hocks HK to lift the legs LG and the hocks HK up along the hock openings HO until finally the hocks HK pass out of the hock openings HO to release the hocks from the hock holding loops HL and unload the poultry P from the shackles SH. It will further be seen that each of the unloader bars 69 toward the outlet end 68 thereof includes a pair of upstanding inverted V-shaped risers 72 which project up above the hock openings HO to deflect the legs LG of any poultry P still held by the hock holding loops HL on the shackles SH to insure release of the hocks HK from the shackle holding loops HL. This unloads the poultry P from the shackles SH so that the poultry P can drop down onto a chute CH (FIG. 1) or appropriate conveyor (not shown) to move the unloaded poultry away from the shackle unloading device 10. The inlet ends of the unloader bars 69 are joined by a V-shaped connector bar 74 to maintain the spacing between the leading ends of the unloader bars 69. The spacing between the unloader bars 69 is such that not only does the unloader bars 69 lift the legs of the poultry P upwardly to unload the poultry from the shackles SH but also restrain lower ends of the shackles SH against lateral displacement from the conveying path CP, especially in the arcuate portion $CP_A$. The leading inlet ends of the unloader bars 69 are supported by upstanding support rods 75 adjustably mounted on the cross brace 28 while the trailing outlet ends of unloader bars 69 are supported by upstanding support rods 76 adjustably mounted on the angle side beam 24.

OPERATION

As best seen in FIG. 3, the shackles SH supporting the poultry P move into the shackle unloading device 10 where the lower ends of the shackles SH pass between the infeed guide rods 56 in the infeed guide assembly 55 so that the hock holding loops HL are positively held between the infeed guide rods 56 as the hock holding loops HL on the shackles SH move along the conveying path CP. When the shackles SH approach the arcuate portion $CP_A$ of the conveying path CP, the infeed guide rods 56 direct the hock holding loops HL and shackles SH around the arcuate portion $CP_A$ of the conveying path CP so that the hock holding loops HL and the shackles SH are vertically aligned over the space $S_S$ between the unloader bars 69. This position has been indicated as position $P_1$ on FIG. 3. FIG. 4 is a transverse view taken across the conveying path CP at position $P_1$.

It will thus be seen that, as the shackles SH continue to move around the arcuate portion $CP_A$ of the conveying path CP, the inwardly rising unloader bars 69 pass upwardly on opposite sides of the hock holding loops HL of the shackles SH so that the unloader bars 69 now control the position of the hock holding loops HL and shackles SH at their lower ends to insure that the shackles SH continue to move along the arcuate portion $CP_A$ of the conveying path CP. It will also be noted that, after the unloader bars 69 have engaged opposite sides of the hock holding loops HL, the shackles SH pass out of contact with the infeed guide rods 56. This is illustrated at position $P_2$ in FIG. 3. FIG. 5 is a transverse view across the conveying path CP at position $P_2$ and shows the unloader bars 69 passing up on opposite sides of the hock holding loops HL and shackles SH. It will also be noted that, as the unloader bars 69 pass upwardly on opposite sides of the hock holding loops HL, the legs of the poultry P are engaged by the unloader bar 69 on that side of the hock holding loops HL opposite the hocks HK to lift the legs LG and thus the hocks HK up along the hock openings HO between the hock opening loops HL. It will also be noted that the poultry P may be hung in the hock holding loops HL of the shackles SH from either side of the shackles with one position being illustrated by solid lines in FIG. 5 while the alternate position is illustrated by dashed lines in FIG. 5. It will further be noted that only that unloader bar 69 which is opposite the hocks HK will generally engage the legs LG of the poultry P to lift the legs LG up along the shackles SH so as to eventually dislodge the hocks HK from the hock holding loop HL.

The shackles SH continue to move around the arcuate portion $CP_A$ of the conveying path CP until the unloader bars 69 have lifted the legs LG of the poultry P sufficiently high in the hock openings HO for the hocks HK to be released from the hock holding loops HL whereupon the poultry P falls from the shackles SH and are thus unloaded therefrom. The poultry P is generally unloaded from the shackles SH by the time the shackles SH reach the position $P_3$ seen in FIG. 3. FIG. 6 is a view taken transversely of the conveying path CP at position $P_3$ which shows the poultry P dropping away from the back holding loops HL and the shackles SH. The poultry P then drops down onto the chute CH seen in FIG. 1 or other appropriate conveying means to move the unloaded poultry P away from the shackle unloading device 10.

It will be appreciated that, while a shackle unloading device 10 is illustrated which unloads the poultry P from the shackles SH as the shackles SH move along an arcuate portion $CP_A$ of the conveying path, the concepts of the shackle unloading device 10 may be equally well applied to unloading the shackles SH while the shackles SH move along other paths such as a straight path. One possible way of doing this is to make the guide rods 56 and the unloader bars 69 straight while using a chain with lugs mounted thereon in place of the auxiliary shackle drive wheel 40.

What is claimed as invention is:

1. A shackle unloading device for poultry comprising:
    an overhead conveyor moving along a prescribed conveying path;
    a plurality of shackle assemblies mounted on and moved by said overhead conveyor successively along the conveying path, each of said shackle assemblies including a shackle and a shackle support rod connecting said shackle to said overhead conveyor so that said shackle is supported below said overhead conveyor for swinging movement with respect thereto, each of said shackles having an upper portion and a lower portion, said lower portion including a pair of spaced apart hock holding loops adapted to support the poultry by its hocks and for the poultry to be unloaded therefrom by lifting upwardly on the legs of the poultry adjacent its hocks;
    infeed guide means positioned below said overhead conveyor in substantially vertical alignment with the conveying path for engaging the lower portion of each of said shackles above the hocks of the poultry carried thereby as the shackles move along the conveying path to keep the lower portion of said shackle substantially in vertical registration with the conveying path in a direction generally transverse of the conveying path while allowing said shackles to freely swing with respect to said overhead conveyor in a direction along the conveying path;
    auxiliary guide means positioned below said overhead conveyor, above said infeed guide means and in substantially vertical alignment with the conveying path for engaging the upper portion of each of said shackles after engagement by said infeed guide means to keep the upper portions of said shackles substantially in vertical registration with the conveying path in a direction transverse of the conveying path while allowing said shackles to swing freely with respect to said overhead conveyor in a direction along the conveying path;
    auxiliary driving means synchronously moving with said overhead conveyor for selectively engaging said shackle support rod of each of said shackle assemblies after engagement of said shackle by said auxiliary guide means so as to limit the swinging movement of each of said shackle assemblies with respect to said overhead conveyor away from the vertical in a direction along the conveying path and opposite the direction of movement of said shackle assemblies by said overhead conveyor along the conveying path; and
    pair of spaced apart elongate unloader bars positioned on opposite sides of the conveying path and extending therealong so that the lower ends of the hock holding loops of each of said shackles pass between said unloader bars while engaged by said infeed guide means, said auxiliary guide means, and said auxiliary driving means; said unloader bars keeping the hock holding loops of said shackles substantially in vertical registration with the conveying path in a direction generally transverse of the conveying path after release thereof by said infeed guide means and while engaged by said auxiliary guide means and said auxiliary driving means, said unloader bars further oriented to pass underneath the legs of the poultry adjacent their hocks and lift the hocks of the poultry upwardly with respect to the hock holding loops of said shackle to free the hocks from said shackle and unload the poultry therefrom while said shackles continue to be engaged by said auxiliary guide means and said shackle support rods continue to be engaged by said auxiliary driving means.

2. The shackle unloading device of claim 1 wherein said infeed guide assembly includes a pair of spaced apart infeed guide bars adapted to receive a hock holding loop of each of said shackles therebetween above the hocks of the poultry carried thereby to keep the lower portion of said shackle substantially in vertical registration with the conveying path in a direction generally transverse of the conveying path while allowing said shackles to freely swing with respect to said overhead conveyor in a direction along the conveying path.

3. The shackle unloading device of claim 2 wherein said auxiliary guide means includes a pair of spaced apart auxiliary guide bars adapted to receive the upper portion of each of said shackles therebetween above said infeed guide bars after engagement of said shackle by said infeed guide bars to keep the upper portion of said shackles in vertical registration with the conveying path in a direction transverse to the conveying path as said shackle moves along the conveying path yet said shackles can swing with respect to said overhead conveyor in a direction along the conveying path.

4. The shackle unloading device of claim 3 wherein the conveying path along which said overhead conveyor successively moves said shackle assemblies includes an arcuate portion having a prescribed radius of curvature; wherein said infeed guide bars engage the hock holding loops of each of said shackles prior to said shackle reaching the arcuate portion of the conveying path and keep the hock holding loops of said shackles substantially in vertical registration with the conveying path in a direction generally transverse to the conveying path until said shackles are engaged by said unloader bars while allowing said shackles to swing with respect to said overhead conveyor in a direction along the conveyor path; wherein said auxiliary guide bars engage the upper portion of each of said shackles to keep said shackles substantially in vertical registration with the arcuate portion of the conveying path in a direction transverse to the conveying path as said shackle moves along the arcuate portion of the conveying path yet said shackles can swing with respect to said overhead conveyor in a direction along the conveying path; wherein said auxiliary driving means engages said support rod of each of said shackle assemblies as said shackle assembly moves along the arcuate portion of the conveying path; and wherein said unloader bars engage each of said shackles as said shackle moves along the arcuate portion of said conveying path and unloads the poultry from said shackle as said shackle moves along the arcuate portion of said conveying path.

5. The shackle unloading device of claim 4 including idler drive means interconnecting said overhead conveyor and said auxiliary driving means so that said overhead conveyor synchronously drives said auxiliary driving means through said idler drive means.

6. The shackle unloading device of claim 5 wherein said idler drive means includes a rotatably mounted common support shaft and a circular idler wheel mounted on said common support shaft and drivingly engaged by said overhead conveyor as it moves along the arcuate portion of the conveyed path so that said overhead conveyor synchronously rotates said idler wheel and said common support shaft; wherein said auxiliary driving means includes an auxiliary drive wheel mounted on said common support shaft for rotation with said common support shaft, said auxiliary driving wheel drivingly engaging the shackles below said overhead conveyor as the shackles move along the arcuate portion of the conveyed path to assist said overhead conveyor in moving the shackles along the arcuate portion of the conveyed path.

* * * * *